United States Patent [19]

Nakamura et al.

[11] Patent Number: 4,757,311
[45] Date of Patent: Jul. 12, 1988

[54] DOT MATRIX PANEL DISPLAY CONTROL

[75] Inventors: Tutomu Nakamura; Masahiro Yoshimura, both of Nara, Japan

[73] Assignee: Sharp Kabushiki Kaisha, Osaka, Japan

[21] Appl. No.: 649,481

[22] Filed: Sep. 11, 1984

[30] Foreign Application Priority Data

Sep. 16, 1983 [JP] Japan ............................ 58-171489

[51] Int. Cl.⁴ ............................................. G09G 1/16
[52] U.S. Cl. ................................... 340/731; 340/724; 340/726; 340/748
[58] Field of Search .............. 340/702, 705, 731, 757, 340/768, 792, 800, 709, 724, 726; 358/180, 748

[56] References Cited

U.S. PATENT DOCUMENTS

| | | | |
|---|---|---|---|
| 4,090,188 | 5/1978 | Suga | 346/731 |
| 4,129,860 | 12/1978 | Yonezawa et al. | 340/731 |
| 4,257,044 | 3/1981 | Fukuoka | 340/731 |
| 4,283,724 | 8/1981 | Edwards | 340/731 |
| 4,314,244 | 2/1982 | Demke et al. | 340/731 |
| 4,320,395 | 3/1982 | Meissen et al. | 340/731 |
| 4,323,896 | 4/1982 | Fiedler et al. | 340/792 X |
| 4,357,604 | 11/1982 | Imazeki et al. | 340/731 |
| 4,386,351 | 5/1983 | Lowdenslager | 340/768 |
| 4,409,591 | 10/1983 | Simkovitz | 340/731 |
| 4,546,349 | 10/1985 | Prohotsky et al. | 340/731 |
| 4,557,671 | 11/1982 | Miller | 340/792 X |
| 4,589,029 | 5/1986 | Torinaru et al. | 358/180 |

Primary Examiner—Gerald L. Brigance
Attorney, Agent, or Firm—Birch, Stewart Kolasch & Birch

[57] ABSTRACT

A dot matrix image display system displays a desired portion of an image in increased magnification on a dot matrix image display panel. A shift circuit functions to automatically shift the position of the enlarged portion in a predetermined direction on the dot matrix image display panel. The shift circuit determines not only the portion to be displayed with increased magnification but also a speed at which the enlarged display is shifted.

4 Claims, 2 Drawing Sheets

DOT MATRIX PANEL DISPLAY CONTROL

BACKGROUND OF THE INVENTION

1. Field of the Invention

The present invention relates to a dot matrix display panel system and, more particularly, to a display control system which displays any desired portion of the image with increased magnification.

2. Description of the Prior Art

In a television video signal display panel or an electronic viewfinder, it is convenient when a desired image portion is displayed with increased magnification. Such a display system generally includes a dot matrix display panel having a plurality of picture elements aligned in a matrix fashion. The resolution, which determines the picture quality of the dot matrix display panel and the size of decipherable characters, depends on the number of the picture elements included in the dot matrix display panel.

When an image signal is constructed to be applied to a matrix display panel having 500 (H)×240 (V) picture elements, one character is generally displayed by 8 (V)×6 (H) dots (picture elements). If a small matrix display panel having 250 (H)×120 (V) picture elements is employed to display the image signal, the scanning lines are thinned so that one character is displayed by 4 (V)×3 (H) dots (picture elements). In this case some characters become indecipherable. Thus, it is preferable that a desired image portion is displayed with increased magnification so that one character included in the selected image portion is displayed by 8 (V)×6 (H) dots as if the matrix display panel had 500 (H)×240 (V) picture elements.

An image enlarging system in an electronic viewfinder having a dot matrix display panel is disclosed in copending U.S. patent application, "ELECTRONIC VIEWFINDER", Ser. No. 530,468, filed on Sept. 8, 1983 by Yasuo Torimaru and Masahiro Yoshimura, now U.S. Pat. No. 4,589,029 and assigned to the same assignee as the present application, wherein the shift signal for shifting the video signal has a pulse width corresponding to the degree of magnification, and synchronizing signals are delayed in accordance with the image portion to be magnified.

The display control system disclosed in the above-mentioned patent is effective to display a desired portion in an enlarged size. However, an external control signal must be applied to X and Y delay circuits to select the portion to be enlarged.

OBJECTS AND SUMMARY OF THE INVENTION

Objects of the Invention

Accordingly, an object of the present invention is to provide a dot matrix display panel drive system which displays a desired portion of the image with increased magnification.

Another object of the present invention is to provide a dot matrix display panel drive system which displays a desired image portion with increased magnification, wherein the enlarged image portion is automatically shifted in a predetermined direction.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

SUMMARY OF THE INVENTION

To achieve the above objects, pursuant to an embodiment of the present invention, an X delay period setting circuit and a Y delay period setting circuit are provided for automatically determining the X delay period and Y delay period which determine the image portion to be displayed with increased magnification. In a preferred form, the enlarged image portion is automatically shifted along the sentence displayed on the dot matrix display panel.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
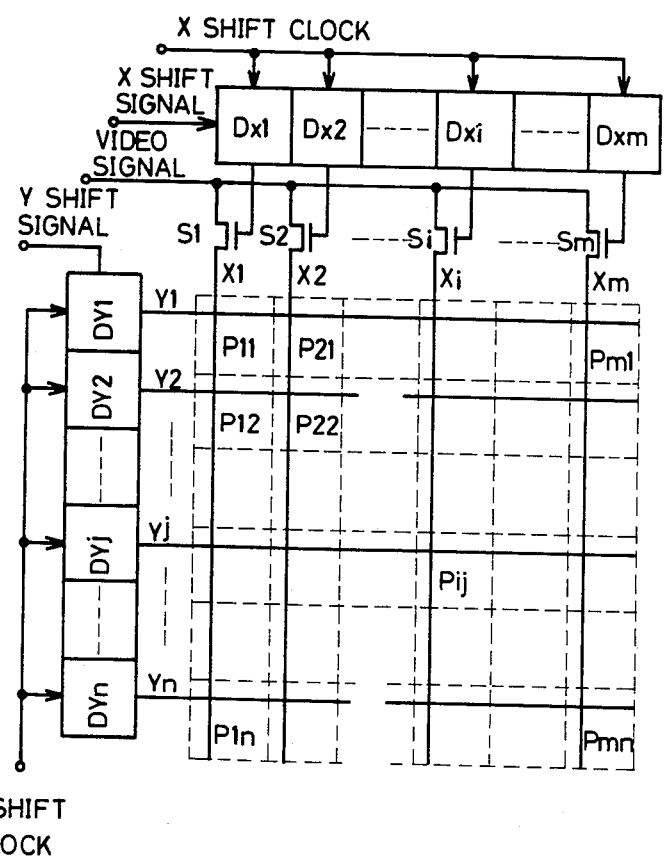
FIG. 1 is an equivalent circuit diagram of a matrix image display panel associated with an embodiment of a display control system of the present invention.

FIG. 1 is an equivalent circuit diagram of a dot matrix image display panel having picture elements arranged in a matrix of m rows and n columns. In FIG. 1, reference characters $DX_1$ through $DX_m$ designate row scanning X shift registers, $DY_1$ through $DY_n$ designate column scanning Y shift registers, $S_1$ through $S_m$ designate X line selecting transistors, $X_1$ through $X_m$ designate X lines, $Y_1$ through $Y_n$ designate Y lines, and $P_{11}$ through $P_{mn}$ designate picture elements in the matrix form. The picture elements $P_{ij}$ can be so-called "switch matrix type picture elements" having an active switch, or can be so-called "ordinary matrix type picture elements" having no active element. The display element can be an EL (Electroluminescent) element, a liquid crystal element, or a fluorescent display element.

The operation of the circuit of FIG. 1 will be described for the case of displaying a television image. When the $Y_1$ line is selected by a Y shift signal synchronous with a vertical synchronizing signal, and the $X_1$ line selecting transistor $S_1$ is turned on by an X shift signal synchronous with a horizontal synchronizing signal, the picture element $P_{11}$ is selected to emit light in accordance with the amplitude of a video signal. When one X shift clock pulse is applied to the row scanning X shift registers $DX_1$ through $DX_m$, the $X_2$ line selecting transistor $S_2$ is turned on so that the picture element $P_{21}$ emits light in accordance with the video signal at that time. Similarly, the remaining X line selecting transistors $S_3$ through $S_m$ are scanned. Thus, the image data is written into the picture elements $P_{11}$ through $P_{ml}$ connected to the $Y_1$ line. When one Y shift clock pulse is applied to the column scanning Y shift registers $DY_1$ through $DY_n$ and the X shift signal is supplied again, the picture element $P_{12}$ is selected. All the picture elements are scanned in this manner so that one image field is written into the matrix image display panel.

Figure 2:
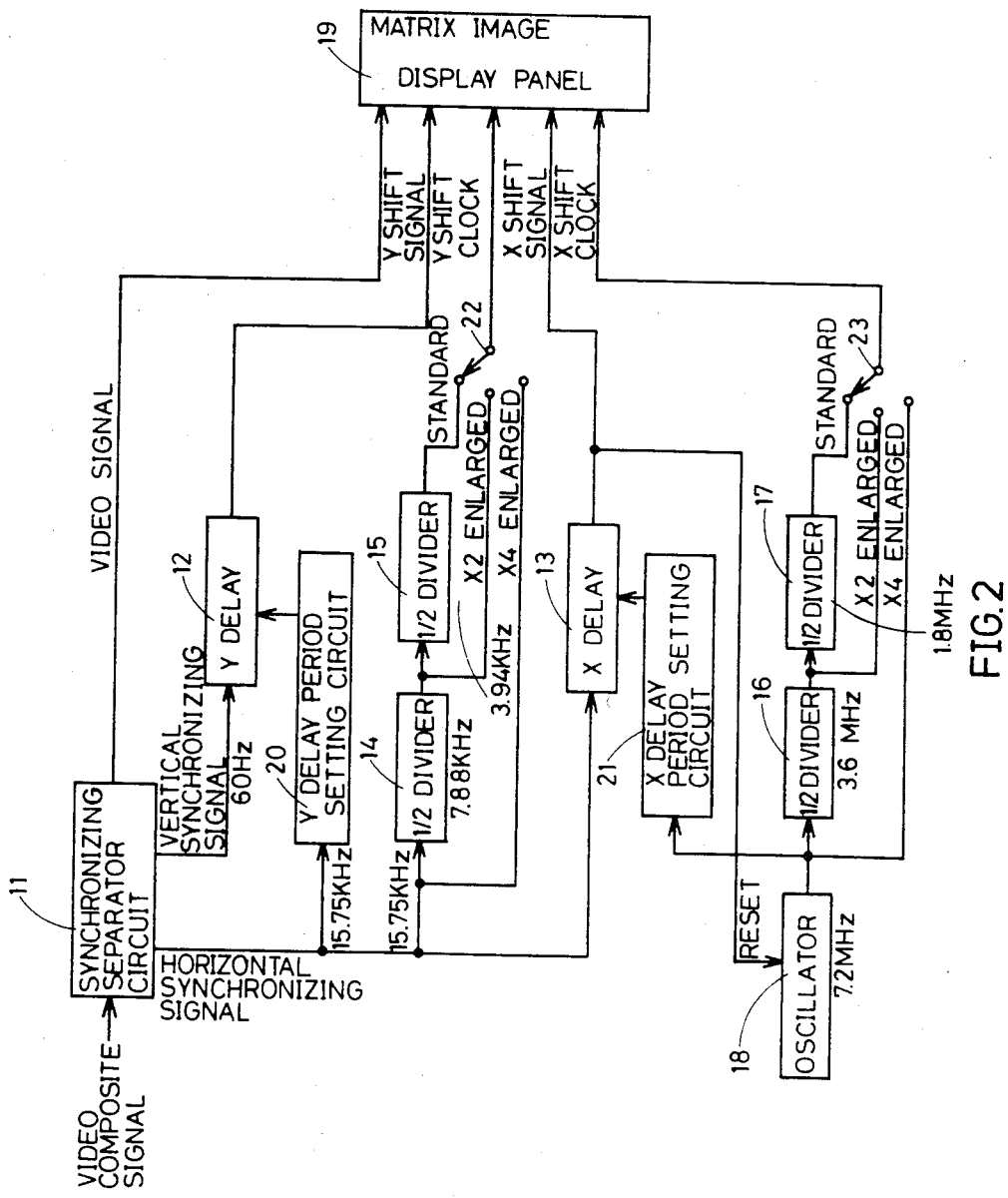
FIG. 2 is a block diagram of an embodiment of a display control system of the present invention.

FIG. 2 is a block diagram of a display control system connected to the matrix image display panel of FIG. 1. For convenience, the display control system of FIG. 2 will be described for the case where an NTSC video signal is used to display an image without interlaced scanning. Furthermore, it will be assumed that in the matrix image display panel of FIG. 1, m (X lines)=96, and n (Y lines)=60.

The display control system of FIG. 2 includes a synchronizing separator circuit 11 for obtaining a horizontal synchronizing signal, a vertical synchronizing signal and a video signal from an NTSC video composite signal. A Y delay circuit 12 delays the vertical synchronizing signal for a predetermined period of time, and an X delay circuit 13 delays the horizontal synchronizing signal for a predetermined period of time. The display control system further includes four ½ frequency dividers 14, 15, 16 and 17, and a high frequency oscillator 18 oscillating in synchronization with the horizontal synchronizing signal. A Y delay period setting circuit 20 determines the delay period which is applied to the Y delay circuit 12. An X delay period setting circuit 21 determines the delay period which is applied to the X delay circuit 13. A pair of selection switches 22 and 23 are provided so as to supply the shift clock pulse of a desired frequency suited for the selected magnification to a matrix image display panel 19.

As is well known in the display art, a horizontal period of 63.5 μs has an effective image data period of 53.3 μs. In displaying an image having the standard size, the video signal should be sampled equally for the number (96) of the rows. Therefore, the X shift clock frequency $f_X$ is as follows:

$$f_X = \frac{96}{53.3 \times 10^{-6}} \simeq 1.8 \text{ MHz}$$

On the other hand, the Y shift clock pulse should switch the selection of the sixty (60) Y lines with respect to 240 effective scanning lines (which are available when no interlaced scanning is carried out) so that the Y shift clock pulse selects one Y line per four effective scanning lines. Therefore, the Y shift clock frequency $f_Y$ is as follows:

$$f_Y = \frac{15.75 \times 10^3}{4} \simeq 3.94 \text{ KHz}$$

As shown in FIG. 2, the oscillating signal of 7.2 MHz frequency developed from the high frequency oscillator 18 which oscillates in synchronization with the horizontal synchronizing signal, is frequency-divided by the two ½ frequency dividers 16 and 17 so as to obtain the X shift clock pulse having the frequency of 1.8 MHz. The Y shift clock pulse with a frequency 3.94 KHz can be obtained by directly frequency-dividing the 15.75 KHz horizontal synchronizing signal using the two ½ frequency dividers 14 and 15. When a portion of an image is to be displayed with a magnification of ×2, both the X shift clock pulse and the Y shift clock pulse should have frequencies which are two times as high as the frequencies of the shift clock pulses used to display the standard size image. These doubled frequencies are obtained at the outputs of the ½ frequency dividers 14 and 16, respectively. In this case, if the X and Y shift signals are applied, without delay, based on the synchronizing signals, the upper left-hand portion of the image will be displayed on the matrix image display panel 19 with the magnification of ×2.

The portion to be displayed with the desired magnification is selected by setting desired delay periods in the Y delay circuit 12 and the X delay circuit 13, respectively. In accordance with the present invention, the delay periods are automatically increased or decreased by the Y delay period setting circuit 20 and the X delay period setting circuit 21, respectively, so that the enlarged display portion is automatically shifted. That is, the Y delay period setting circuit 20 and the X delay period setting circuit 21 store the information which determines the portion to be displayed with the increased magnification and the velocity at which the displayed portion is shifted. The Y delay period setting circuit 20 and the X delay period setting circuit 21 calculate the desired delay periods in accordance with the stored information and the portion now displayed on the matrix image display panel 19. The thus obtained delay periods are applied from the Y delay period setting circuit 20 and the X delay period setting circuit 21 to the Y delay circuit 12 and the X delay circuit 13, respectively.

An operational mode of the display control system of FIG. 2 will be described when the character information received on the NTSC video signal is displayed on the matrix image display panel 19 without interlaced scanning. Now assume that the matrix image display panel 19 has the construction of m=96, and n=60, the display is conducted with ×2 magnification so as to enhance the visibility of characters, and the enlarged display portion is automatically shifted along the sentence. The character pitch on the matrix image display panel 19 is eight scanning lines in the vertical direction, and 53.3/L (μs) (L: the number of characters in one row) on the time axis of the video signal in the horizontal direction.

Now assume that a period of t (sec.) is required for the ordinary person to read one character. The Y delay period and the X delay period are first set to zero (0) so that the upper left-hand portion of the sentence is first displayed on the matrix image display panel 19. Then, in order to smoothly shift the image rightward, the X delay period setting circuit 21 calculates the X delay period which increases 53.3/2L (μs) at each t (sec.). The thus obtained increasing X delay period is applied to the X delay circuit 13 so as to control the display region. When the right end of the enlarged image reaches the right end of the matrix image display panel 19, the Y delay period setting circuit 20 develops a control signal to increase the delay period determined by the Y delay circuit 12 by a period corresponding to eight (8) scanning lines. The X delay period is reset to zero (0), and, thereafter, the X delay period is gradually increased by the control signal developed from the X delay period setting circuit 21. These operations are repeated to sequentially provide the enlarge display along the sentence to be displayed.

When limit values are set to the delay periods determined by the Y delay period setting circuit 20 and the X delay period setting circuit 21, a preselected portion of the image is sequentially displayed with increased magnification. The shift velocity of the enlarged image is controlled by changing the increasing rate of the delay periods determined by the Y delay period setting circuit 20 and the X delay period setting circuit 21.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A dot matrix image display system comprising:
   a dot matrix image display panel;
   magnification means for selecting and magnifying a desired portion of an image on said dot matrix image display panel such that said portion of said image is displayed with increased magnification relative to the remainder of said image; and
   shift means for shifting the position of said desired portion of said image on said dot matrix image display panel at a predetermined speed such that different portions of said image are displayed with said increased magnification.

2. The dot matrix display system of claim 1, further comprising:
   horizontal and vertical delay means for selecting the horizontal and vertical boundaries of said desired portions of the image to be displayed at increased magnification,
   said shift means shifting the position of said desired portion by varying the delay period of said horizontal and vertical delay means.

3. A dot matrix image display system comprising:
   a dot matrix image display panel including a plurality of X electrodes and a plurality of Y electrodes, which determine, in combination, picture image elements arranged in a matrix fashion;
   video signal application means for applying a video signal to said dot matrix image display panel so as to display an image composed of said picture image elements on said dot matrix image display panel;
   magnification means for enlarging selected portions of said image on said dot matrix image display panel;
   position selecting means for selecting a portion of the image on said dot matrix image display panel to be displayed as an enlarged image portion;
   shift means for shifting said enlarged image portion in a predetermined direction along said image on said dot matrix image display panel; and
   speed control means for determining a speed at which said enlarged image portion is shifted.

4. The dot matrix image display system of claim 3, wherein said position selecting means comprises:
   a Y delay circuit which determines the uppermost image portion displayed by the uppermost Y electrode; and
   an X delay circuit which determines the leftmost image portion displayed by the leftmost X electrode.

* * * * *